G. C. PURDY & D. W. EDWARDS.
MACHINE FOR ADZING AND BORING TIES.
APPLICATION FILED MAR. 24, 1911.

1,141,886.

Patented June 1, 1915.
11 SHEETS—SHEET 1.

G. C. PURDY & D. W. EDWARDS.
MACHINE FOR ADZING AND BORING TIES.
APPLICATION FILED MAR. 24, 1911.

1,141,886.

Patented June 1, 1915.
11 SHEETS—SHEET 5.

Witnesses:
Robert H. Weir
W. L. Dow.

Inventors
G. C. Purdy
D. W. Edwards
By A. O. Behel
Atty.

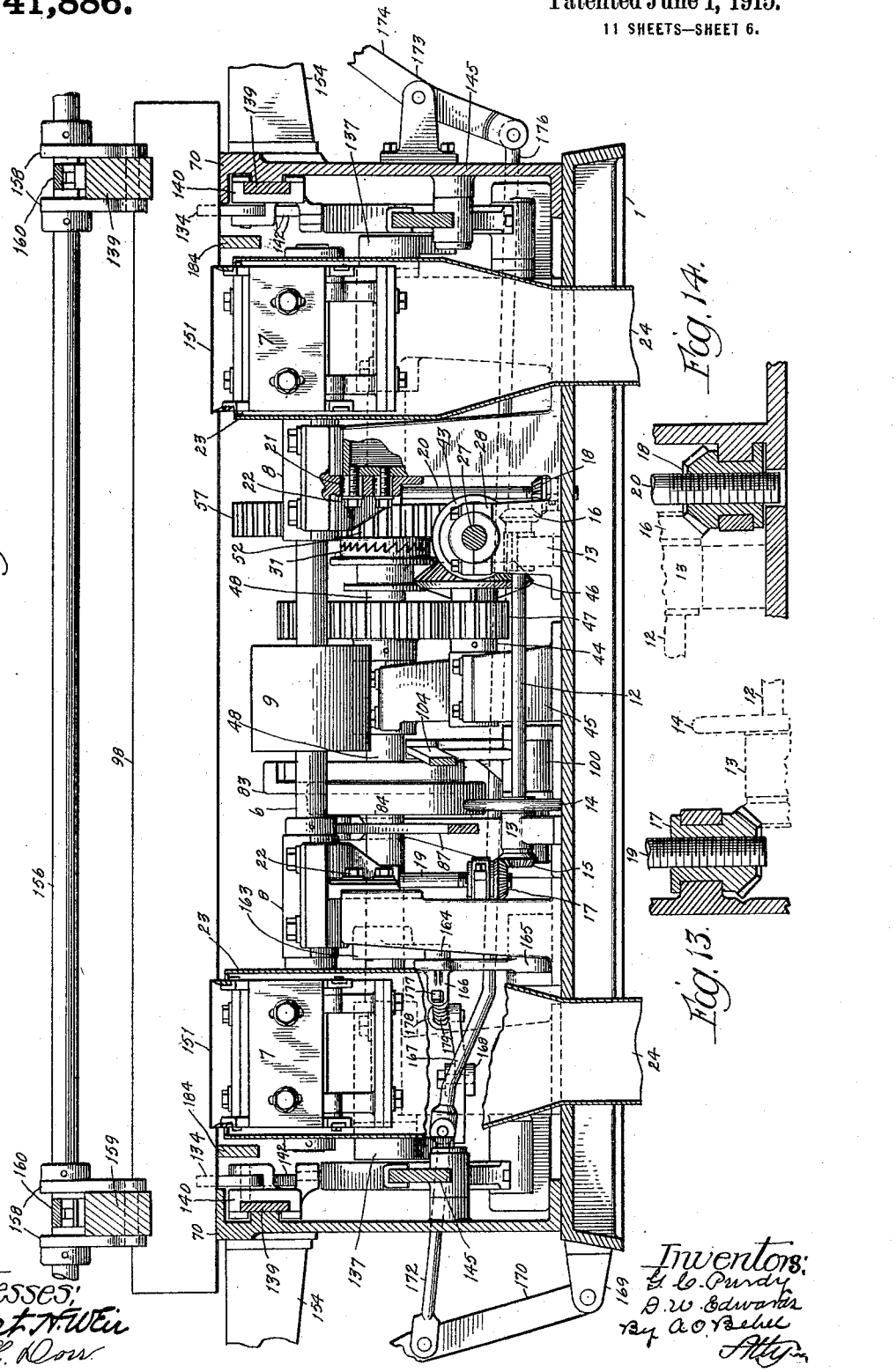

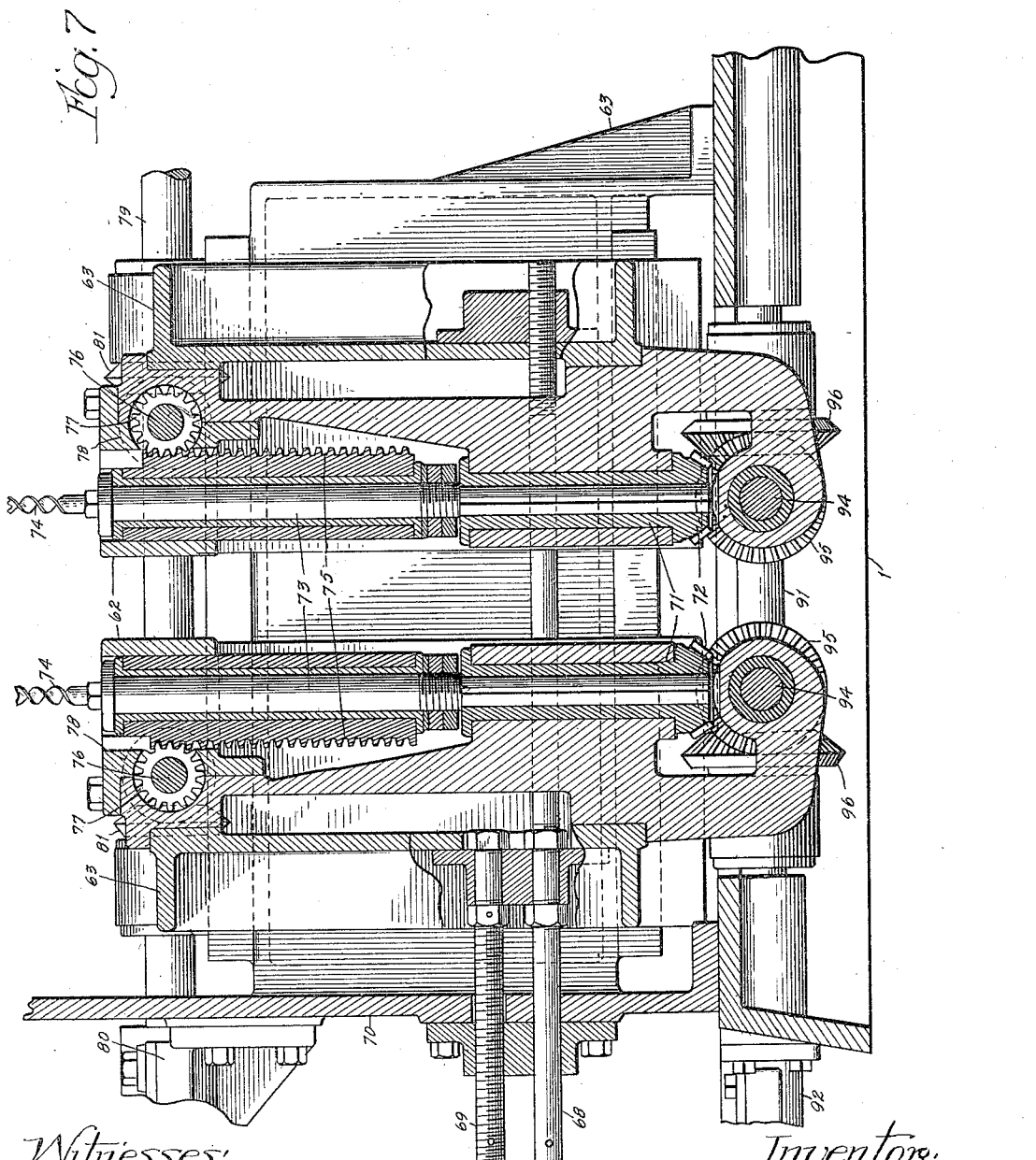

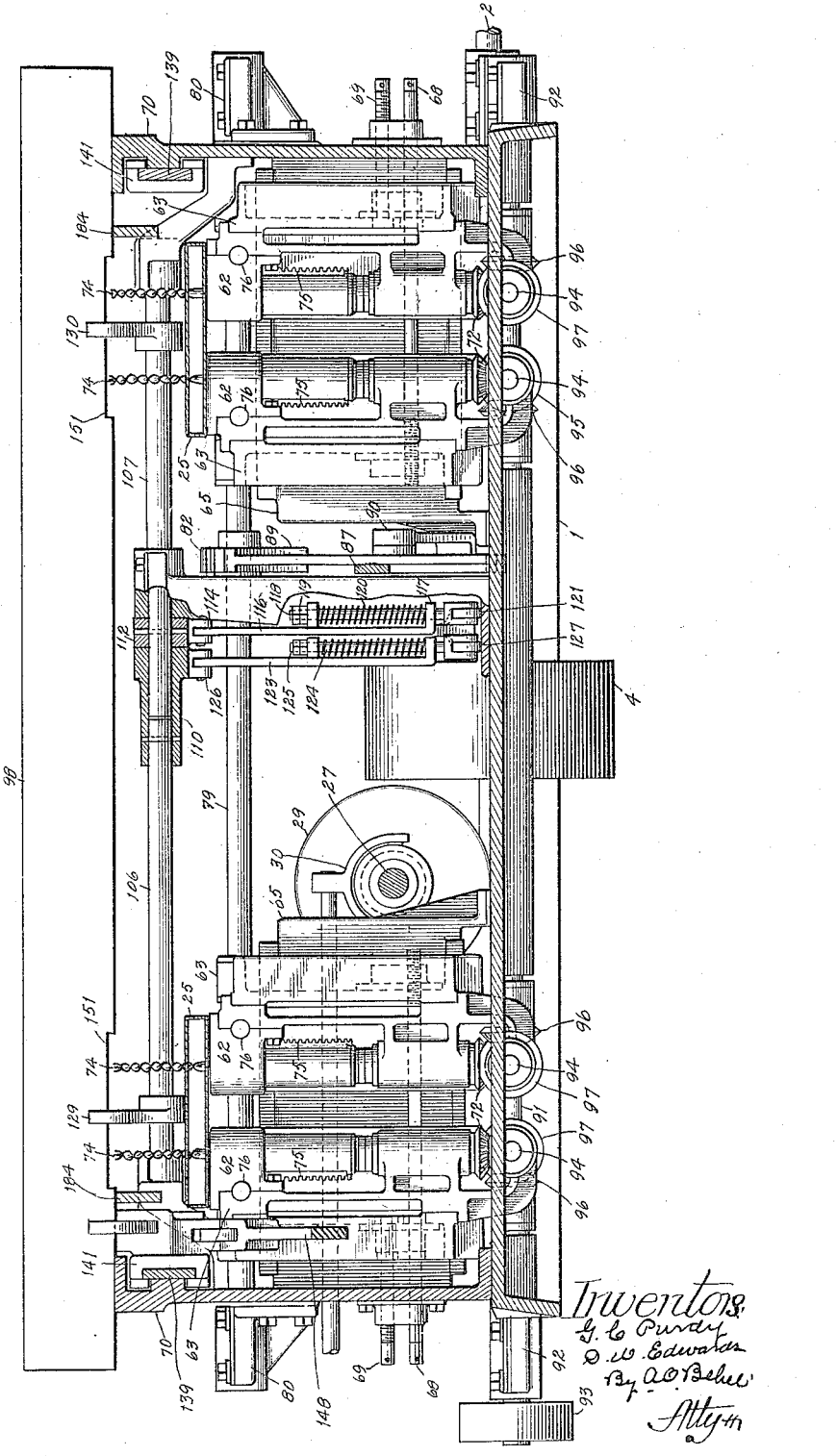

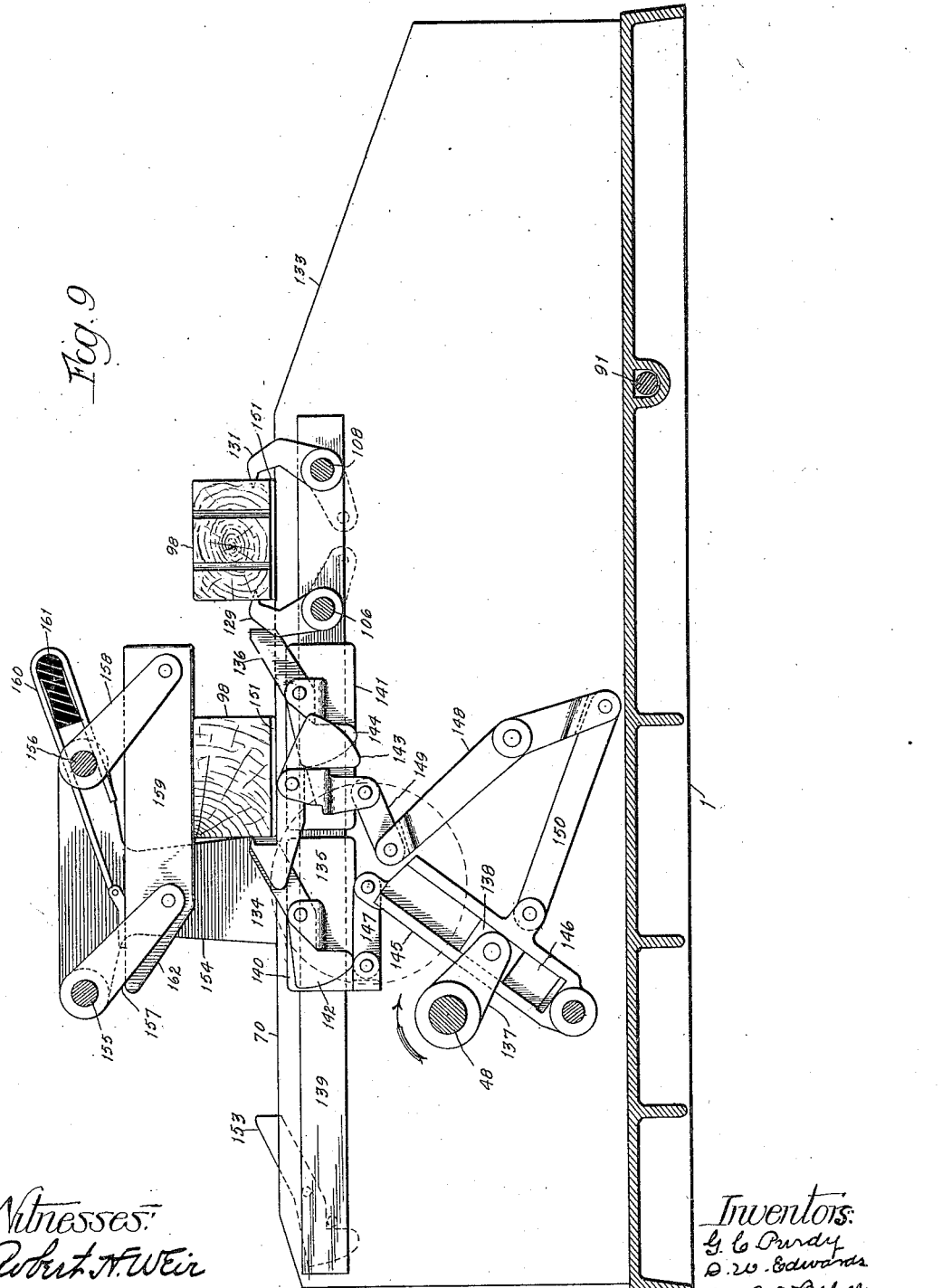

G. C. PURDY & D. W. EDWARDS.
MACHINE FOR ADZING AND BORING TIES.
APPLICATION FILED MAR. 24, 1911.
1,141,886.
Patented June 1, 1915.
11 SHEETS—SHEET 10.
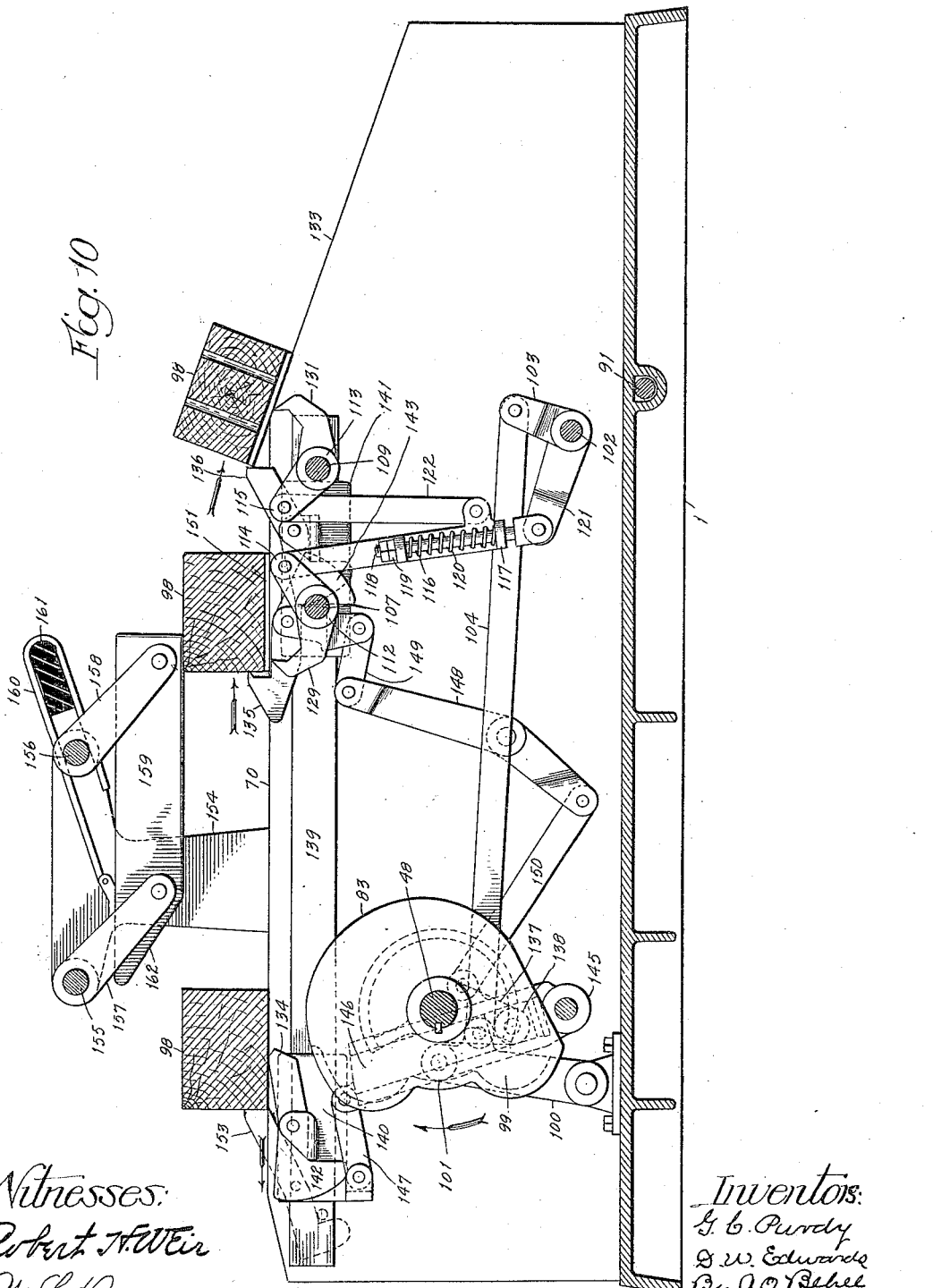

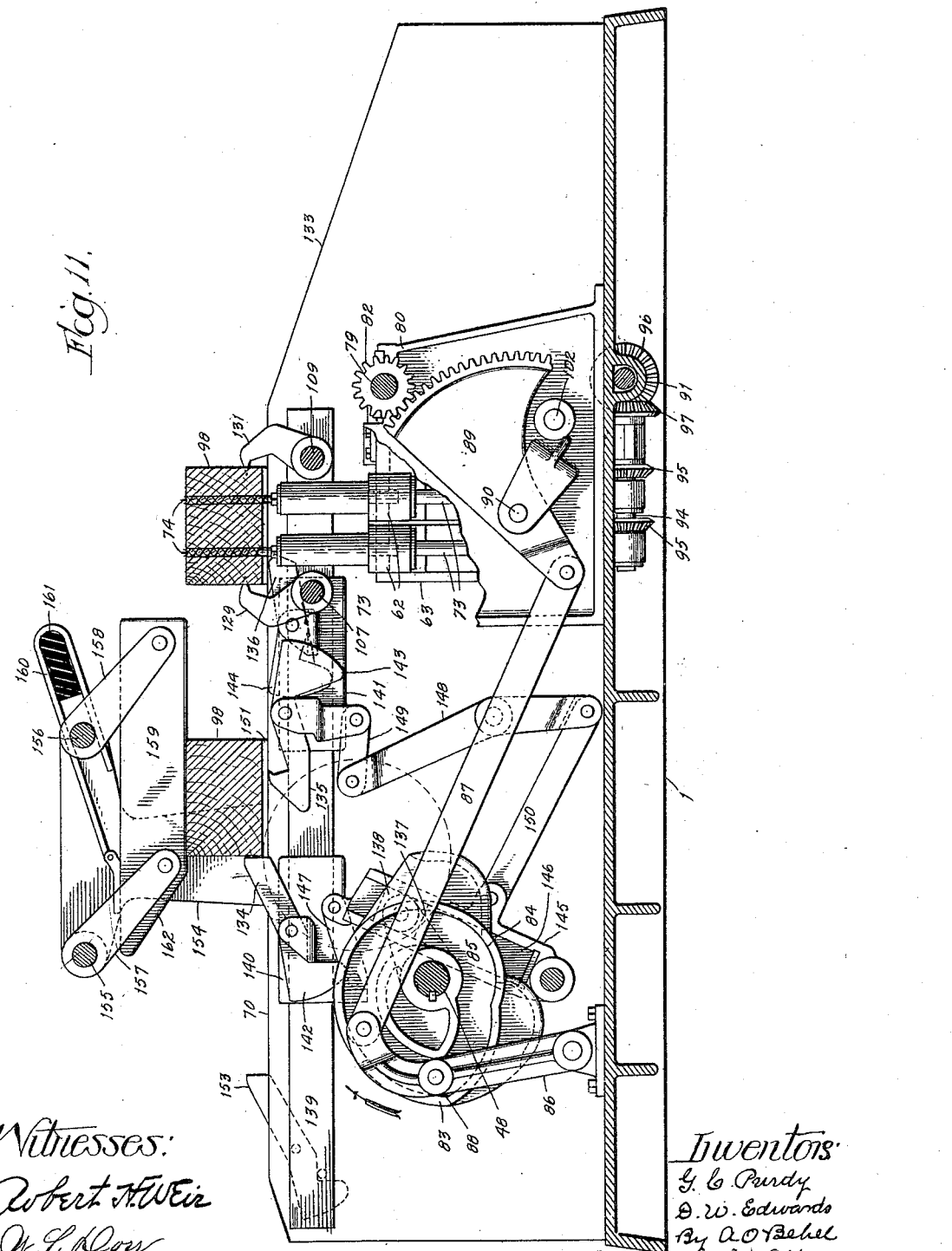

UNITED STATES PATENT OFFICE.

GEORGE C. PURDY AND DANIEL W. EDWARDS, OF ROCKFORD, ILLINOIS, ASSIGNORS TO GREENLEE BROS. & COMPANY, OF ROCKFORD, ILLINOIS, A CORPORATION OF ILLINOIS.

MACHINE FOR ADZING AND BORING TIES.

1,141,886.       Specification of Letters Patent.       Patented June 1, 1915.

Application filed March 24, 1911. Serial No. 616,711.

*To all whom it may concern:*

Be it known that we, GEORGE C. PURDY and DANIEL W. EDWARDS, citizens of the United States, residing at Rockford, in the county of Winnebago and State of Illinois, have invented certain new and useful Improvements in Machines for Adzing and Boring Ties, of which the following is a specification.

The object of this invention is to automatically form a gain in a tie transversely, also to boring holes for the reception of the spikes employed to connect the rails to the ties.

Figure 1:
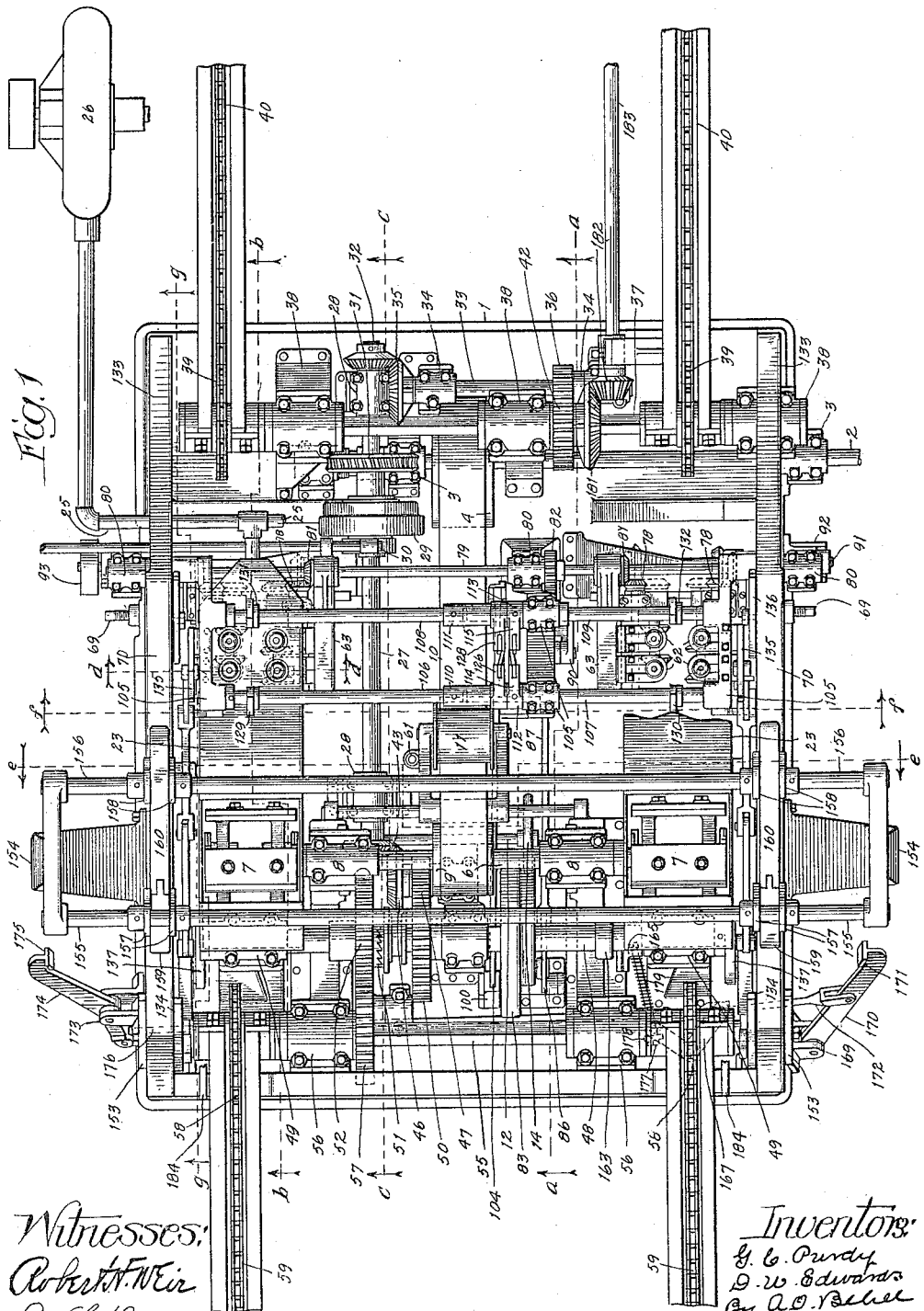
Figure 2:
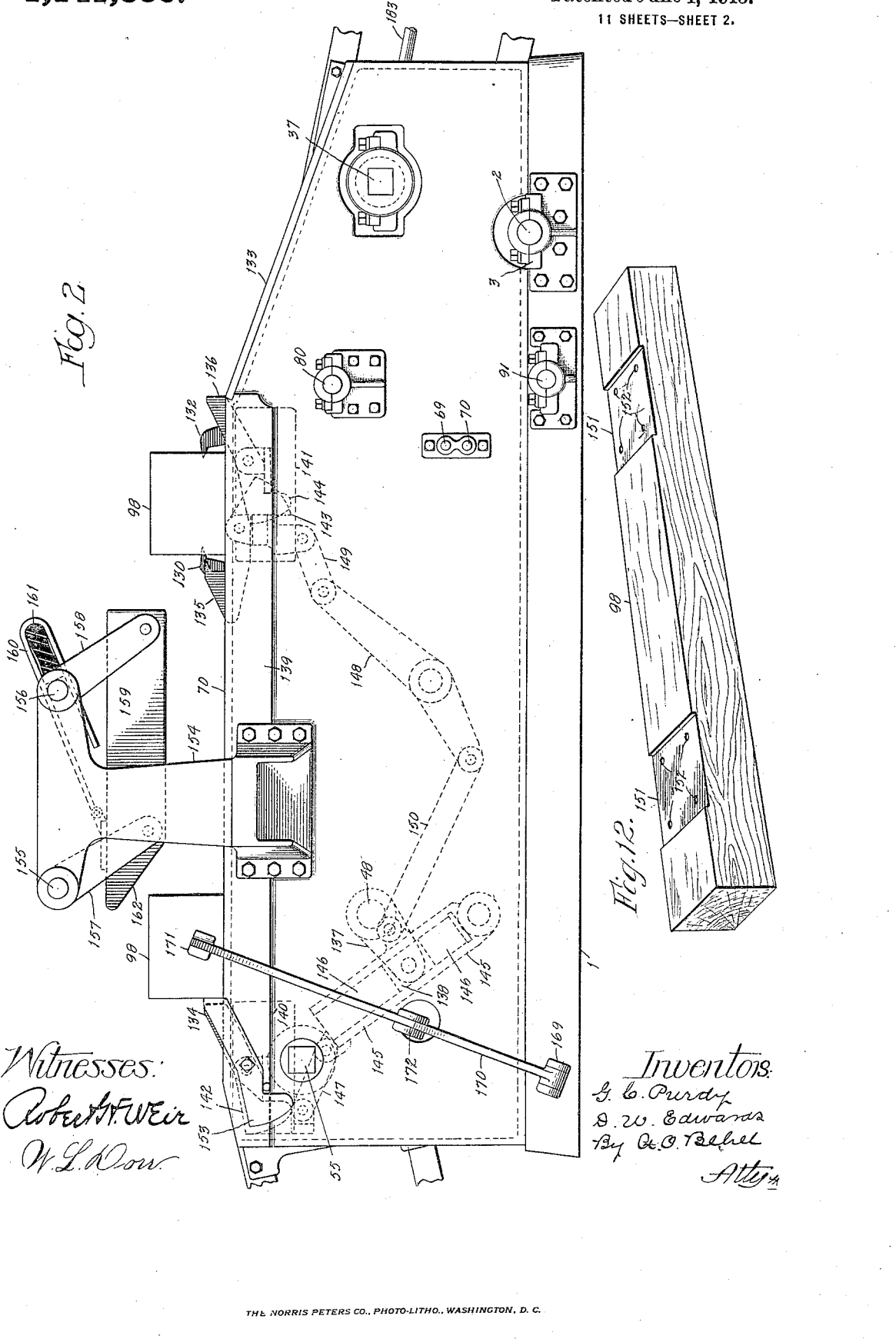
Figure 3:
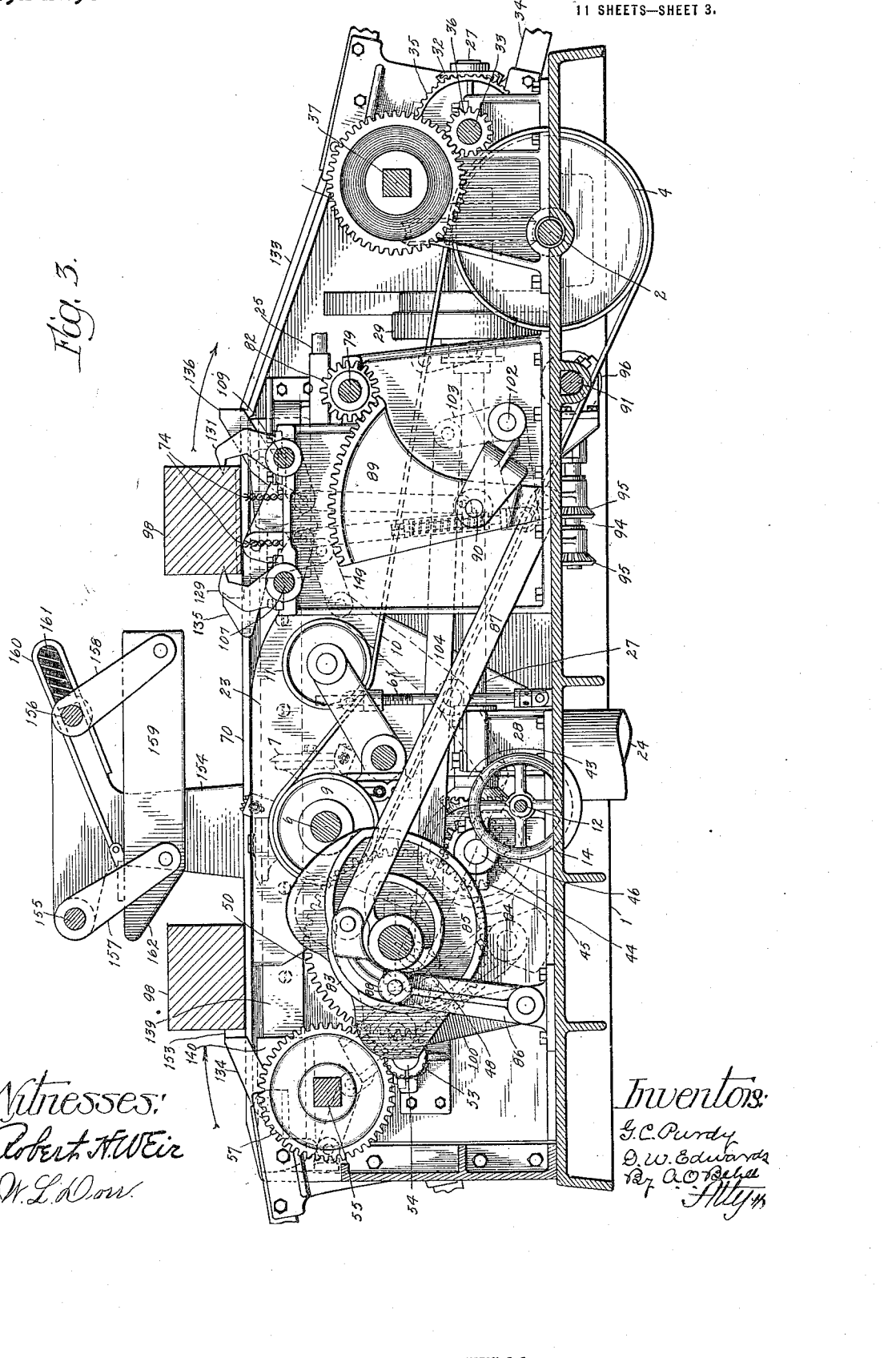
Figure 4:
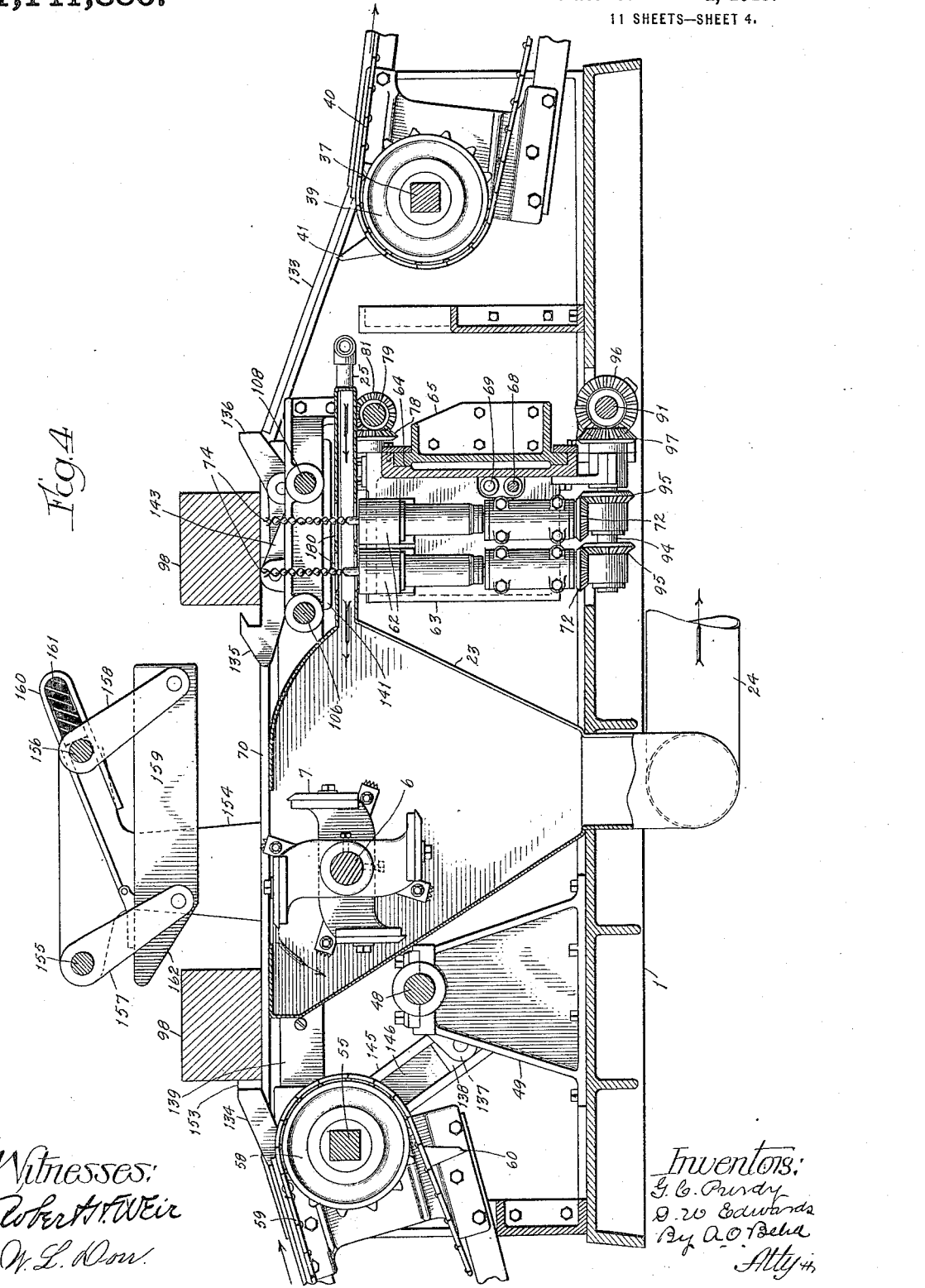
Figure 5:
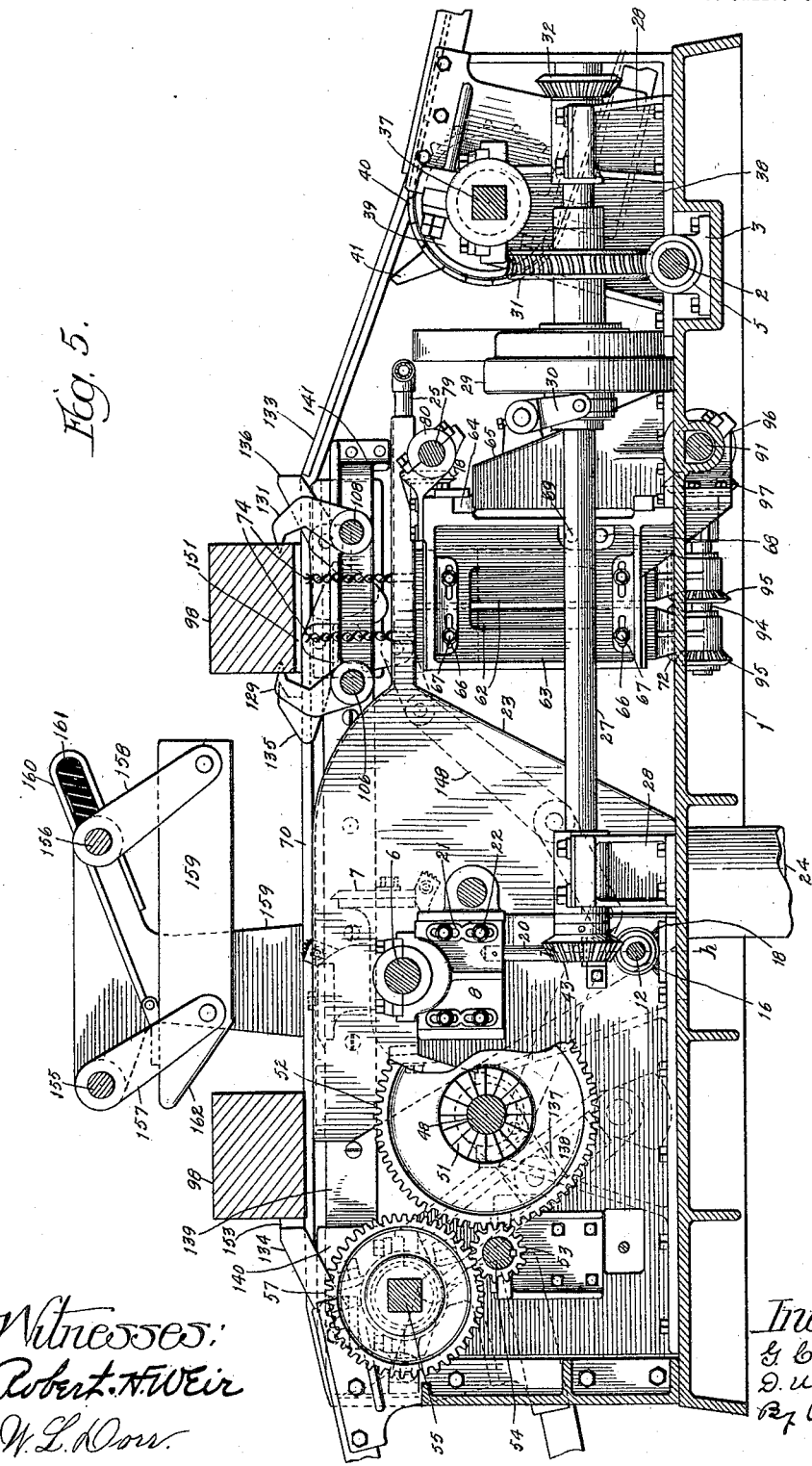

In the accompanying drawings, Figure 1 is a plan view. Fig. 2 is a side elevation. Fig. 3 is a vertical lengthwise section on dotted line $a\ a$ Fig. 1. Fig. 4 is a vertical lengthwise section on dotted line $b\ b$ Fig. 1. Fig. 5 is a vertical lengthwise section on dotted line $c\ c$ Fig. 1. Fig. 6 is a transverse section on dotted line $e\ e$ Fig. 1. Fig. 7 is a transverse section on dotted line $d\ d$ Fig. 1. Fig. 8 is a transverse section on dotted line $f\ f$ Fig. 1. Fig. 9 is a vertical lengthwise section on dotted line $g\ g$ Fig. 1. Fig. 10 is a vertical lengthwise section. Fig. 11 is a vertical lengthwise section. Fig. 12 is a perspective view of a tie which has been gained and bored. Figs. 13 and 14 are vertical sections on dotted line $h\ h$ Fig. 5.

The operative parts of the machine are supported by a base 1. The main driving shaft 2 is supported in boxes 3. To this shaft are secured a pulley 4 and a worm 5. A shaft 6 to which are connected the adzing heads 7 is supported in boxes 8, and to this shaft is secured a pulley 9 over which a belt 10 passes which also passes around the pulley 4 on the main driving shaft. A belt tightener 11 rests on the belt 10. A shaft 12 is supported in bearings 13 and to it is secured a hand-wheel 14, also two beveled gears 15 and 16. Two beveled-gears 17 and 18 are supported in bearings in a manner to revolve therein and each is formed with a screw-threaded opening within which are turned the screw-threaded ends of the rods 19 and 20 respectively, and these two rods have their upper ends connected with the bearings 8. These bearings are formed with vertical slots 21 (Fig. 5) through which bolts 22 pass. By means of the hand-wheel 14, the beveled-gears 17 and 18 are revolved which will move the rods 19 and 20 lengthwise, which will move the bearings 8 and move the cutter-heads nearer to or farther from the material operated upon. The bolts 22 will hold the bearings when adjusted.

Around each adzing head is located a hood 23 having their lower ends terminating in tubes 24. With each hood is connected a pipe 25, and a blower 26 (Fig. 1) connects with these pipes and by which a current of air is forced into the hoods and finally escaping by way of the tubes 24 carrying the chips cut by the adzing heads, which will prevent the clogging up of the other parts of the machine. A shaft 27 is supported in bearing 28. A friction clutch 29 is operated by the forked lever 30, (Fig. 8) and its object will be described later. To this shaft 27 is secured a worm-wheel 31, also a beveled-gear 32. A shaft 33 is supported in bearings 34, and to this shaft are secured a beveled-gear 35, and a spur-pinion 36. The beveled-gear 35 meshes with the beveled-gear 32. A shaft 37 is supported in bearings 38, and on this shaft are loosely mounted two sprocket-wheels 39. Linked chains 40 pass over these sprocket-wheels and each chain is provided with fingers 41 at intervals. To this shaft 37 is secured a spur-gear 42, which meshes with the spur-pinion 36. As the main shaft 2 revolves the worm 5 will revolve the worm-wheel 31 and it in turn will revolve the shaft 27. The beveled-gears 32 and 35 will revolve the shaft 33, and the spur-gears 36 and 42 will revolve the shaft 37. A beveled-gear 181 is rotated with the shaft 37, and meshes with a beveled-pinion 182 to which is connected a shaft 183. This shaft 183 is to be connected with a shaft to which is connected sprocket wheels receiving the chain belts 40, so that they will revolve the sprocket-wheels 39 idly on the shaft 37.

To the shaft 27 is secured a beveled-gear 43. A shaft 44 is supported in a bearing 45, and to this shaft is secured a beveled-gear 46. A spur pinion 47 is secured to the shaft 44. A shaft 48 is supported in bearings 49, and to this shaft is secured a spur-gear 50. A ratchet-faced clutch 51 is connected with the shaft 48, and a spur-gear 52 is formed a part of this clutch. A spur-pinion 53 is connected to a stub-shaft 54, and meshes with the spur-gear 52. A shaft 55 is supported in bearings 56, and to this shaft is secured a spur-gear 57 which meshes with the spur-pinion 53. To this shaft 55 are secured two sprocket-wheels 58 over which chain belts 59 pass, and these chain belts support dogs 60 at intervals. The rotation of the shaft 2 will rotate the shaft 27 through the friction clutch 29, and the shaft 27 will rotate the shaft 44. The shaft 44 will rotate the shaft 48 and this shaft 48 through the ratchet-faced clutch 51 will rotate the shaft 55 which will move the upper section of the chain belts toward the machine.

The belt tightener 11 is supported by the rod 61 screw-threaded in connection with the belt tightener support and its other end is connected to the base 1 in a pivotal manner. By turning the rod 61 the belt-tightener can be adjusted vertically.

Eight heads 62 are arranged in pairs and each pair is supported by the bracket 63 (Fig. 4) on the guide-ways 64 arranged transversely of the machine and form a part of the supports 65. The brackets 63 are formed with horizontal slots 66 (Fig. 5) and bolts 67 pass through these slots into the heads, which allow for the adjustment of the heads of a pair toward and from each other. Two pair of these heads are movable in unison toward and from each other, and both pair are movable together. The first movement is accomplished by the rod 68 having a rotatable connection with one of the brackets 63 of one pair and having a screw-thread connection with the bracket 63 of the other pair. By turning this rod the bracket with which the screw-thread is connected is moved toward or from the other bracket. The second movement is accomplished by the rod 69 having a screw-threaded connection with the sides 70 of the main frame and a rotatable connection with one of the brackets 63. By turning this rod, both brackets will be moved in unison transversely of the frame of the machine.

Each head 62 supports a sleeve 71, (Fig. 7) the lower end of which is formed with a beveled-gear 72, and within each sleeve is located a spindle 73 having a spline connection with the sleeve. Each spindle supports a bit 74, also a rack 75. A shaft 76 for each pair of heads has a spur-gear 77 for each rack 75, and each shaft has a beveled-gear 78 connected to it. A shaft 79 is supported in bearings 80, and to this shaft are connected beveled-gears 81, one for each of the beveled-gears 78 on the shafts 76 with which they mesh. A spur-pinion 82, is connected to the shaft 79.

To the shaft 48 is secured a double faced cam 83, the face 84 of which is formed with an irregular groove 85. An arm 86 is pivotally connected to the base 1 and to its upper end is pivotally connected a bar 87. Intermediate the ends of this bar 87 is journaled a roller 88 which is located in the cam groove 85. A toothed segment 89 is pivotally supported at the point 90 intermediate its ends, and the teeth of this segment mesh with the spur-pinion 82. The bar 87 is pivotally connected to the lower end of the toothed segment which will form a connection between the cam groove 85 and the toothed segment. The rotation of the cam 83 will rock the arm 86 which will move the bar 87 in the direction of its length, and it in turn will oscillate the toothed segment, and the toothed segment will impart a reversible rotary movement to the shaft 79 through the spur-pinion 82. The beveled-gears 81 will be given a like movement which will impart a reversible rotary movement to the shafts 76 and the spur-pinions 78, which will reciprocate the racks 75 and also reciprocate the spindle 76 which will raise and lower the bits 74. A shaft 91 is supported in bearings 92 and is rotated by a belt connection (not shown) with the pulley 93. A shaft 94 is supported by each pair of heads 62, and each shaft supports two beveled-gears 95 which mesh with the beveled-gears 72 on the lower ends of the sleeves 71. On the shaft 91 are secured four beveled-gears 96 which mesh with the beveled-gears 97 on the shafts 94. The rotation of the shaft 91 will impart a rotary movement to the bits 74 through the various beveled-gears just described, and this rotary movement is continuous while the bits are being raised and lowered.

The means for centering the ties 98 over the bits 74 and holding them while being bored comprises the cam-groove 99 on one face of the double faced cam 83. An arm 100 (Fig. 10) supports a roller 101 at its upper end which is located in the cam groove 99. A bell crank is pivoted on the rod 102 and the arm 103 thereof is connected to the arm 100 by the bar 104. Two rock shafts are supported by the bearings 105, one rock shaft comprising the sections 106 and 107, and the other rock shaft comprises the sections 108 and 109. At Fig. 8, is shown the manner of supporting the sections of the rock shafts so that they can have rocking movements independently. To the sections 106 and 108 are connected collars 110, and 111 respectively by pins, and these collars are long enough to receive the inner ends of the rock shaft sections 107 and 109. To the rock shaft sections 107 and 109 are pinned collars 112 and 113 respectively. From the collars 112 and 113 extend arms 114 and 115 respectively. To the arm 114 is connected a bar 116 from which extends a lug 117. A rod 118 passes through the lug 117, and to its upper end is screw-threaded a nut 119. A spring 120 surrounds the rod 118 and rests between the nut 119 and the lug 117. The lower end of this rod is pivotally connected to the arm 121 of the bell-crank. A link 122 has one end pivotally connected to the arm 115 and its other end is pivotally connected to the bar 116 (Fig. 10). A bar 123, spring 124 and rod 125 form a connection between the arm 126 and the other branch 127 of the arm 121. The arm 128 of the collar 111 is connected to the bar 123 by a link similar to the link 122. To the sections 106, 107, 108 and 109 of the rock shafts are connected the hooked dogs 129, 130, 131 and 132 respectively. When the cam 83 is rotated it will rock the arm 100 which will impart a reciprocatory movement to the bar 104, and it in turn will rock the bell-crank which will pull down on the arms of the four collars connected to the sectional rock shafts and will rock the rock shafts. The hooked dogs being connected to the sectional rock shafts will be rocked from the positions shown at Fig. 10 into the positions shown at Fig. 3, for the purpose of locating the tie 98 centrally over the bits 74. By providing sectional rock shafts with dogs thereon, ties differing in width at their opposite ends may be properly gripped and centered over the boring tools. This is accomplished by the springs 120 and 124, and the tension of these springs can be varied by the nuts 118 and 125. The further turning of the cam will retract the hooked dogs into their lower positions.

The means for moving the ties from the time they are deposited upon the side-bars 70 of the machine until they are placed over the bits, and after being bored delivered onto the downwardly inclined sections 133, comprises three dogs 134, 135 and 136 arranged adjacent to the inside of each of the sides 71 of the machine, and the same reference numerals will be applied to both. To the shaft 48 are secured two cranks 137, each supporting a block 138. To the inner face of each of the side bars 70 near their upper edge is secured a guide-way 139, and each guide-way supports two guides 140 and 141. The guide 140 has the dog 134 pivotally connected to it and has a weighted end 142. The guide-way 141 has the two dogs 135 and 136 pivotally connected to it, and each has weighted ends 143 and 144 respectively. To the inner faces of the sides 70 are pivoted two rocker bars 145, each provided with a guide-way 146, within which are located the blocks 138. A link 147 forms a connection between the bar 145 and the guide 140. To the sides 70 are pivoted two bell-cranks 148, and a link 149 connects one end of each bell-crank with the adjacent guide 141. A link 150 connects the other end of each bell-crank with the jacent bar 145. The rotation of the cranks 137 will oscillate the bar 145, and when moved into the position shown at Fig. 2, the guides 140 and 141 will be separated the farthest distance apart. When the bar 145 is in the position shown at Fig. 9, the guides 140 and 141 will be in their closest position.

After a tie has been landed on the sides 70 of the frame by the elevating carrier the dogs 134 will engage it and move it into the position shown at Fig. 9. The dogs 135 will then engage the tie and move it into the position shown at Fig. 10. The dogs 129, 130, 131 and 132 will then center the tie over the bits into the position shown at Fig. 4, while the bits are boring the holes in the tie, the dogs 135 and 136 are being withdrawn from the position shown at Fig. 4 into the positions shown at Fig. 9. After the bits have been withdrawn the dogs 136 will move the tie from the position shown in Fig. 9, into the position shown at Fig. 10 onto the inclines 133, of the frame, down which it will slide to be moved away by the carrier at the delivery end of the machine. The movement of the tie from its engagement by the dogs 134 until placed over the bits is practically continuous, and in the travel it passes over the two adzing heads which will cut the gain 151. The bits will bore the eight holes 152 in the cutaway portion 151 of the tie (Fig. 12).

The weighted ends of the dogs 134, 135 and 136 will return the dogs into their operative positions after passing under the ties when assuming a position to engage the ties. After the ties 98 have been delivered onto the sides of the machine by the elevator, the dogs 153 pivotally supported by the sides and having weighted ends, will hold the tie in position to be engaged by the dogs 134 by which it is given its first advancing movement.

To each side 70 of the frame is secured a bracket 154 which support two rods 155 and 156. Four arms 157 are swingingly supported by the rod 155, and four arms 158 are likewise supported by the rod 156. These eight arms 157 and 158 are pivotally connected to two weights 159, one located over each side 70 of the frame. To each weight 159 is pivotally connected a loop 160 to the closed end of which is located a cushion bumper block 161. The weights 159 are employed to hold the tie close to the sides 70 while passing over the adzing heads, in the cutting of the gains 151, and being suspended by the arms 157 and 158 they will accommodate themselves to the varying thicknesses of ties. When the ties are moved free of the weights 159 the rubber blocks 161 will contact with the rod 156 thereby preventing their further descent. Each weight has one end 162 beveled so as to allow the ties to pass under them.

Means are provided for centering the ties transversely of the machine after they are delivered onto the sides 70 and before they are engaged by the dogs 134. To the shaft 48 is secured a crank 163 supporting a roller 164 (Fig. 6) at its free end. To the base 1 is pivotally mounted an arm 165 from which extends a projection 166. The roller 164 of the crank 163 will at each revolution engage the arm 165 and oscillate it. A bell-crank 167 is supported by a bracket 168 connected to the frame of the machine. To the base 1 is connected a bracket 169 to which is pivoted a bar 170 having its upper end formed with a cross-bar 171. A link 172 has one end connected to this bar and its other end is pivotally connected to one arm of the bell-crank 167. A bracket 173 is connected to one of the sides 70 of the machine to which is pivoted a bar 174 having its upper end formed with a cross-bar 175. A link 176 has one end connected to this bar 174, and its other end is pivotally connected to the same arm of the bell-crank 167 that the link 172 is connected. A rod 177 is connected to the projection 166 and passes through a projection 178 extending from the other arm of the bell-crank 167. A spring 179 surrounds the rod 178 and rests between the projections 166 and 178.

As the arm 165 is rocked by the crank 163, it will move the bell-crank 167 through a pressure on the spring 179 and the rocking of this bell-crank will move both bars 170 and 174 so that their cross-bars 171 and 175 will contact with the ends of the tie 98 and move it lengthwise to properly center it transversely on the sides 70 of the main frame. As the movement of the arm 165 is the same each time the roller 164 engages it, and as the ties may be of varying lengths, the spring 179 will allow the bell-crank to move until both cross-bars 171 and 175 contact with the tie, then the movement of the bell-crank will be arrested without interfering with the movement of the bar 165.

A machine constructed as described will automatically elevate the tie onto the machine, move it over the adzing heads which will form two gains transversely of the tie, then move the tie over the boring bits, center the tie over the bits, bore eight holes in the tie, then move the tie from over the bits in position to be received by the delivering carrier. It is noticed that the movement of the tie is practically continuous from the time it is delivered onto the sides 70 until it is centered over the bits. While the bits are boring, another tie is being moved over the adzing heads. The air supplied by the blower 26 will carry away the chips cut by the adzing heads and the openings 180 (Fig. 4) will allow the chips made by the boring bits to drop into the pipe 25 and be carried away by the air blast.

Supplementary supports 184 for the tie extend parallel with the sides 70 and are located inside of the dogs employed to move the tie. Should a short tie or one broken at its end be presented to be moved by the dogs it will rest on these supplemental supports thereby preventing its falling into the operative parts of the machine.

We claim as our invention—

1. A tie adzing and boring machine comprising adzing mechanism and boring mechanism, in combination with a feeding device reciprocable past the adzing mechanism for carrying a tie past the adzing mechanism, and feeding and holding devices for positioning the adzed tie to be operated upon by the boring mechanism, said last mentioned devices being operatively connected with the first mentioned device in such manner that said last mentioned devices feed a tie to boring position and clamp said tie in said boring position during the boring operation, while simultaneously the first mentioned device feeds the next succeeding tie through the zone of operation of the adzing mechanism.

2. An adzing and boring machine comprising a tie support, a rotary cutting tool, a reciprocable boring tool, means for centering and holding the work in position to be bored, and means for operating said elements and for feeding ties along said support past said tools, so that work is fed past the rotary cutting tool while simultaneously work is centered and held and operated upon by the boring tool, the approach of work to the respective tools occurring in alternate sequence.

3. An adzing and boring machine comprising adzing mechanism, boring mechanism, and means for feeding ties in succession past said mechanisms and holding one tie stationary in boring position while a succeeding tie is passing the adzing mechanism, said means including a pair of reciprocatory dogs adapted to respectively feed the ties to the adzing mechanism and then to the boring mechanism, the operations of said dogs being so timed that they reciprocate in alternate sequence.

4. In a machine of the character set forth, the combination with a reciprocatory boring tool, of a cutting tool associated therewith, means for moving the boring tool to bore a hole in an article, a reciprocatory dog movable to positions on opposite sides of the cutting tool for moving an article past the cutting tool, a drive shaft, and rotary means operated by the drive shaft and connected to the tool moving means and to the dog for simultaneously reciprocating the same.

5. In a machine of the character set forth, the combination with a support having a track thereon, of a rotary cutting tool mounted on the support, a reciprocatory boring tool mounted on the support, a pair of carriers slidably mounted on the track, movable dogs mounted on the carriers, one of said dogs being movable to positions on opposite sides of the cutting tool engaging an article to move the article past the cutting tool, the other constituting means for moving the article from the cutting tool to the boring tool, and operating means connected to the carriers for simultaneously moving the same in opposite directions.

6. In a machine of the character set forth, the combination with a support having a track thereon, of a rotary cutting tool mounted on the support, a reciprocatory boring tool mounted on the support, a pair of carriers slidably mounted on the track, movable dogs mounted on the carriers, one of said dogs engaging an article to move the article past the cutting tool, the other constituting means for moving the article from the cutting tool to the boring tool, a drive shaft having a crank arm, a swinging arm operated by said crank arm, and devices connected to the swinging arm and to the carriers for simultaneously reciprocating the same in opposite directions.

7. In a machine of the character set forth, the combination with a cutting tool, of a boring tool, coacting gripping dogs for holding an article in position to be bored, means for automatically opening and closing the dogs, a dog for moving the article from the cutting tool to a position to be gripped by the gripping dogs, and means for automatically actuating the moving dog to carry the article to said latter position when the gripping dogs are open.

8. In a machine of the character set forth, the combination with a cutting tool, of a boring tool, oppositely swinging gripping dogs for holding an article in position to be bored, means for automatically swinging the dogs to open and closed position, a reciprocatory dog for moving the article from the cutting tool to a position to be gripped by the gripping dogs, and automatic means for moving the moving dog away from the gripping dogs when the latter are in gripping position and toward the gripping dogs when the latter are in open position.

9. In a machine of the character set forth, the combination with a support, of tracks mounted thereon, a rotary shaft having gaining heads, a plurality of reciprocatory boring tools, means for rotating the gaining head shaft and the boring tools, sets of reciprocatory carriers slidably mounted on the tracks, one of said sets operating between the gaining heads and the boring tools, the other operating on the opposite side of the gaining heads, dogs pivotally mounted on the carriers, automatic means for reciprocating the sets of carriers in opposite directions to respectively cause one set to move articles successively past the gaining heads and to cause the other set to carry said articles to a position to be bored, oppositely swinging gripping dogs associated with the boring tools to hold an article stationary while being bored, and automatic means for opening and closing the heads in timed relation to permit the dogs to move the articles successively to positions to be gripped.

In testimony whereof we have hereunto set our hands in presence of two subscribing witnesses.

GEORGE C. PURDY.
DANIEL W. EDWARDS.

Witnesses:
A. M. DORAN,
A. O. BEHEL.

Copies of this patent may be obtained for five cents each, by addressing the "Commissioner of Patents, Washington, D. C."